United States Patent [19]

Cichanowski

[11] Patent Number: 4,584,628
[45] Date of Patent: Apr. 22, 1986

[54] MINIATURE MONOLITHIC ELECTRICAL CAPACITOR

[75] Inventor: Stanley W. Cichanowski, Bennington, Vt.

[73] Assignee: SFE Technologies, San Fernando, Calif.

[21] Appl. No.: 625,335

[22] Filed: Jun. 27, 1984

[51] Int. Cl.[4] .......................... H01G 1/14; H01G 7/00
[52] U.S. Cl. .................................... 361/309; 29/25.42
[58] Field of Search .............. 361/304, 305, 306, 308, 361/309, 310, 320, 321, 328, 323; 29/25.42

[56] References Cited

U.S. PATENT DOCUMENTS

| | | | |
|---|---|---|---|
| 3,248,619 | 4/1966 | Ferrante | 361/304 X |
| 3,654,532 | 4/1972 | Rayburn | 361/323 X |
| 4,008,514 | 2/1977 | Elderbaum | 29/25.42 |
| 4,378,620 | 4/1983 | Laverne | 29/25.42 |

Primary Examiner—Donald A. Griffin
Attorney, Agent, or Firm—Christie, Parker & Hale

[57] ABSTRACT

A miniature monolithic capacitor, and a composite sheet from which such capacitors are cut, in which very thin layers of electrode material are stacked between coatings of dielectric with the electrode layers being substantially thickened through their edge portions so that the termination surfaces of the capacitor includes dielectric and the cross section of the thickened edges, thus facilitating edge termination of the capacitor using conventional techniques.

6 Claims, 3 Drawing Figures

U.S. Patent
Apr. 22, 1986
4,584,628
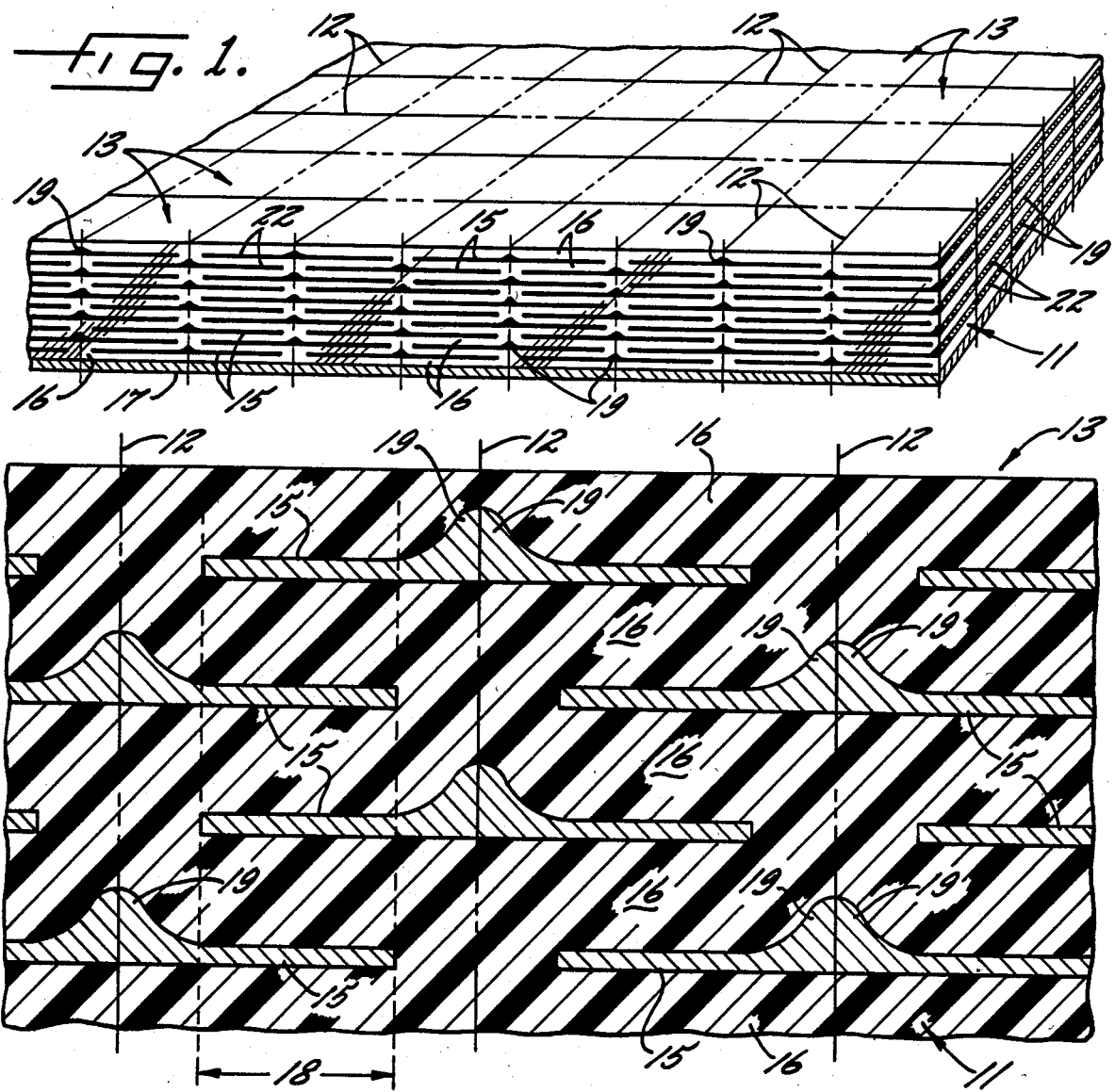
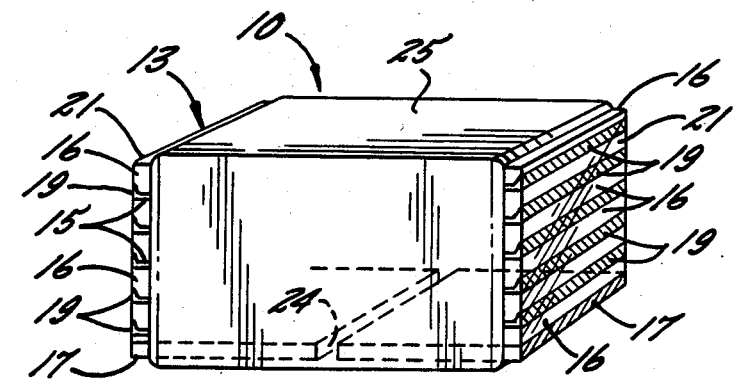

MINIATURE MONOLITHIC ELECTRICAL CAPACITOR

This invention relates generally to facilitating completing the construction of electrical capacitors and more particularly concerns forming a monolithic capacitor to facilitate edge termination.

This invention is related to the following copending, commonly assigned, patent applications: Ser. No. 562,779, filed Dec. 19, 1983, entitled "Miniaturized Monolithic Multi-Layer Capacitor and Apparatus and Method for Making"; Ser. No. 562,873, filed Dec. 19, 1983, entitled "Capacitor With Resin Dielectric and Method of Making"; Ser. No. 562,871, filed Dec. 19, 1983, entitled "Capacitors Containing Polyfunctional Acrylate Polymers as Dielectrics"; Ser. No. 562,893, filed Dec. 19, 1983, entitled "1; 2-Alkanediol Diacrylate Monomers and Polymers Thereof Useful as Capacitor Dielectrics"; Ser. No. 562,872, filed Dec. 19, 1983, entitled "Acrylate-Containing Mixed Ester Monomers and Polymers Thereof Useful as Capacitor Dielectrics"; and Ser. No. 562,894, filed Dec. 19, 1983, entitled "Polyfunctional Acrylate Monomers for Polymers Thereof Useful as Capacitor Dielectrics"; all of which are hereby incorporated by reference.

It has become possible to make miniature monolithic capacitors having alternate layers of electrode material and dielectric material adding up to thousands of layers but with each layer being very thin. Application Ser. No. 562,779, referred to above, discloses capacitors in which the electrode layers defining the plates of the capacitor are in the range of 200–500 angstroms thick, and the electrode layers are separated by dielectric coatings of about one micron thick. Subsequent investigation has shown that dielectric coatings can be thinner, in the range of 0.1 to 1 micron thick. Edge termination of such a capacitor structure is difficult because there is virtually no edge to such extremely thin electrode layers and, if the layers are partially exposed, they are structurally weak.

Accordingly, it is an object of the invention to provide an improved miniature monolithic capacitor that permits conventional end termination procedures, such as schooping, to be followed despite having extremely thin electrode layers in the active capacitance region of the capacitor.

A related object is to provide a capacitor of the foregoing type that can be made at the same high speeds and substantial volumes contemplated for prior designs not embodying the invention.

Other objects and advantages of the invention will become apparent upon reading the following detailed description and upon reference to the drawing, in which:

FIG. 1 is a fragmentary perspective, somewhat diagrammatic, of a composite sheet embodying one form of the invention from which capacitors can be formed;

FIG. 2 is an enlarged fragmentary section of a portion of the sheet shown in FIG. 1; and FIG. 3 is a perspective of a capacitor formed from the sheet of FIG. 1 embodying the invention and prior to edge termination.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawing, there is shown a miniature monolithic capacitor 10 formed from a composite sheet 11 which is cut along lines 12 to form capacitor blocks 13. The sheet 11 can be formed as shown in said application Ser. No. 562,779 by depositing alternate layers 15 of electrode material such as aluminum, and coatings 16 of dielectric material such as curable resin, on a substrate 17 defined by a copper sheet. Each block 13 has a central capacitance region 18 in which the layers 15 are stacked in spaced parallel relationship.

The layers 15 have edge portions 19 extending from the capacitance region 18 to an edge surface 21 of the block 13, with the edge portions 19 being staggered so that every other layer has an edge portion extending to one block edge surface 21 while the intermediate layers have edge portions extending to the opposite block edge surface. In composite sheet form, the layers 15 are defined by long strips 22 of electrode material. To form single electrode layer pairs, a plurality of such strips 22 are disposed parallel to one another and in one plane, and a second plurality is disposed parallel to one another and in a second plane closely spaced from and parallel to the adjacent plane. The strips 22 are offset in the two planes so that the mid-portions of the strips 22 in one plane are adjacent the spaces between the strips in the other plane. When the blocks 13 are cut along the lines 12, a single electrode layer pair in each block is created by the strips in each plane. The total block 13 is formed of a plurality of additional similarly formed electrode layer pairs. Indeed, although only five such pairs are shown in the drawing, in practice hundreds of electrode layers can be deposited.

In accordance with the invention, the portions of the strips 22 intermediate their ends are made substantially thicker than the remainder of the strips so that the resulting layer edge portions 19 have substantially increased thickness from the thin layers 15 in the capacitance regions 18 to much thicker layers whose edges are exposed in the block edge surfaces 21. More specifically, the electrode layer thickness is increased 3 to 5 times. Considering the dimensions stated above, increasing the thickness of a 250 angstrom electrode layer four times produces an exposed edge of the layer portions 19 that is 0.1 microns thick. With the dielectric coating being 1 micron in thickness, the edge surfaces 21 become 10% metal making the edge surface configuration very similar to what is conventionally found in ceramic chip capacitors and conventionally terminated by joining the metal together with electrically conductive material. The process of schooping is typically used for such an end termination formation step. The capacitor 10 is shown ready for edge termination, having had the substrate 17 slotted at 24 to electrically separate the terminal ends 21 and the center or capacitance region of the capacitor surrounded by a passivation layer 25.

The thickened central portions of the layer strips 22 can be formed at the same high speed contemplated by the methods and apparatus of said application Ser. No. 562,779 by forming the aluminum vapor shadow mask that defines the shape of the strips being deposited with a vapor opening extension of appropriate length. The mask as now shown in said application is adapted to deposit more aluminum at the center of each strip for a purpose different than that disclosed here, but the same method and apparatus can be used to form the thickened layer mid-portions of the strips 22.

It can now be seen that the miniature monolithic capacitor 10, despite having extremely thin electrode layers in the active capacitance region, can be provided with end termination through conventional techniques since sufficient metal is exposed at the termination surfaces 21. Nevertheless, the capacitor can be made at the same high speeds and substantial volumes contemplated for the manufacture of such capacitors which do not embody this end termination characteristic.

It will be understood that the foregoing description is only of a certain preferred embodiment, and the invention is to be determined by giving the following claims their proper scope and interpretation.

I claim as my invention:

1. A miniature monolithic capacitor comprising, in combination, a plurality of thin electrode material layers stacked in spaced parallel relationship to define a capacitance region, dielectric material coatings interposed between said layers to hold the layers in said spaced relation, said layers and coatings defining a capacitor block, said layers having edge portions extending from said capacitance region to an edge surface of said block, said edge portions being staggered on said layers so that every other layer has an edge portion extending to one block edge surface while the intermediate layers have edge portions extending to an opposite block edge surface, and said edge portions having substantially increased thickness from the thin layers in the capacitance region to much thicker layers whose edges are exposed in said block edge surfaces for edge termination.

2. The combination of claim 1 in which the layers held in spaced relation in said capacitance region are separated by a coating in the range of 0.3 to 1 micron thick, said exposed electrode material edges being about 0.1 micron thick, and said increased thickness of electrode material being a 3 to 5 times increase.

3. A composite sheet from which individual miniature monolithic capacitors can be formed comprising, in combination, a plurality of strips of electrode material disposed parallel to one another and in one plane, a second plurality of strips of electrode material disposed parallel to one another and in a second plane closely spaced from and parallel to said one plane, said strips being offset in said planes so that portions intermediate the ends of the strips in one plane are adjacent the spaces between the strips in the other plane, dielectric coating surrounding and spacing said strips, and said strip portions intermediate the ends being substantially thicker than the remainder of said strips so that cutting through said thicker portions to form capacitor blocks from the sheet exposes an edge of electrode material for edge termination that is substantially thicker than the rest of the strips.

4. The combination of claim 3 in which the strips of the two pluralities form single electrode layer pairs, and including a plurality of additional similarly formed electrode layer pairs to create multi-layer capacitors.

5. The method of facilitating edge termination of miniature monolithic capacitors comprising the steps of forming first and second pluralities of strips of electrode material in adjacent parallel planes separated by a layer of dielectric coating, said strips being offset so that portions intermediate their ends of the strips in one plane are adjacent the spacing between the strips in the other plane,, increasing the thickness of each strip at said portion intermediate the ends, and cutting through said thickened portions to form capacitor blocks having edges of electrode material substantially thicker than the rest of the strips.

6. A miniature monolithic capacitor comprising, in combination, a plurality of thin electrode material layers stacked in spaced parallel relationship to define a capacitance region, dielectric material coatings from 0.3 to 1 micron thick interposed between said layers to hold the layers in said spaced relation, said layers and coatings defining a capacitor block, said layers having edge portions extending from said capacitance region to an edge surface of said block, said edge portions being staggered on said layers so that every other layer has an edge portion extending to one block edge surface while the intermediate layers have edge portions extending to an opposite block edge surface, and said edge portions having substantially increased thickness from the thin layers in the capacitance region to much thicker layers whose edges are exposed in said block edge surfaces for edge termination.

* * * * *

UNITED STATES PATENT AND TRADEMARK OFFICE
CERTIFICATE OF CORRECTION

PATENT NO. : 4,584,628

DATED : April 22, 1986

INVENTOR(S) : Stanley W. Cichanowski

It is certified that error appears in the above-identified patent and that said Letters Patent is hereby corrected as shown below:

Column 1, lines 9-26 should read as follows:

This invention is related to the following copending, commonly assigned, patent application and patents: Serial No. 562,779, filed December 19, 1983, now abandoned, entitled "Miniaturized Monolithic Multi-Layer Capacitor and Apparatus and Method for Making"; Patent No. 4,499,520, issued February 12, 1985, entitled "Capacitor With Dielectric Comprising Poly-Functional Acrylate Polymer and Method of Making"; Patent No. 4,490,774, issued December 25, 1984, entitled "Capacitors Containing Polyfunctional Acrylate Polymers as Dielectrics"; Patent No. 4,533,710, issued August 6, 1985, entitled "1; 2-Alkanediol Diacrylate Monomers and Polymers Thereof Useful as Capacitor Dielectrics"; Patent No. 4,513,349, issued April 23, 1985, entitled "Acrylate-Containing Mixed Ester Monomers and Polymers Thereof Useful as Capacitor Dielectrics"; and Patent No. 4,515,931, issued May 7, 1985, entitled "Polyfunctional Acrylate Monomers for Polymers Thereof Useful as Capacitor Dielectrics"; all of which are hereby incorporated by reference.

Signed and Sealed this

Twenty-third Day of September 1986

[SEAL]

Attest:

DONALD J. QUIGG

Attesting Officer  Commissioner of Patents and Trademarks